US006563277B1

(12) United States Patent
Takemoto

(10) Patent No.: US 6,563,277 B1
(45) Date of Patent: May 13, 2003

(54) BELT-DRIVE-CONTROL CIRCUIT AND ELECTROPHOTOGRAPHIC DEVICE

(75) Inventor: Hitoshi Takemoto, Niigata (JP)

(73) Assignee: Fuji Xerox Co., Ltd., Tokyo (JP)

( * ) Notice: Subject to any disclaimer, the term of this patent is extended or adjusted under 35 U.S.C. 154(b) by 31 days.

(21) Appl. No.: 09/695,276

(22) Filed: Oct. 25, 2000

(30) Foreign Application Priority Data

Oct. 26, 1999 (JP) .......................................... 11-304717

(51) Int. Cl.[7] .................................................. H02K 7/14
(52) U.S. Cl. ........................................................... 318/3
(58) Field of Search ....................................... 318/3–15

(56) References Cited

U.S. PATENT DOCUMENTS 3,802,188 A * 4/1974 Barrett
4,296,365 A * 10/1981 Yoshikawa
6,050,148 A * 4/2000 Staples et al.
6,324,355 B1 * 11/2001 Matsui et al.

* cited by examiner

*Primary Examiner*—Jeffrey Donels
(74) *Attorney, Agent, or Firm*—McGinn & Gibb, PLLC

(57) ABSTRACT

A belt-drive-control circuit comprises a controller for controlling by using servo constants and servo parameters variable in accordance with the variation in load applied to a belt mounted on rollers. The belt-drive-control circuit comprises a LUT (lookup table) which is a memory. The LUT stores the servo constants and servo parameters optimized by experiments and evaluations in accordance with the load applied to the belt which varies between print sequences. A servo controller which is a major component of the belt-drive-control circuit receives a command from a CPU to rotate a belt-driving motor (a DC motor) together with the data on the load applied to the belt. The servo controller reads from the LUT the servo constant and servo parameter corresponding to the received data on the load, computes the computation expression by using the read servo constant and servo parameter, and outputs computed rotational-speed data to a motor-driving-signal converting circuit.

20 Claims, 4 Drawing Sheets

BELT-DRIVE-CONTROL CIRCUIT AND ELECTROPHOTOGRAPHIC DEVICE

BACKGROUND OF THE INVENTION

The present invention relates to circuits for controlling belt-driving. In particular, the present invention relates to a belt-drive-control circuit for controlling a belt-driving structure, such as a electrophotographic device, in which load varies greatly in late years.

Generally, a belt-driving mechanism comprises, as major components, a plurality of rollers, a belt mounted on the plurality of rollers, and a belt-driving motor for driving one roller among the plurality of rollers. A known belt-driving mechanism is controlled so as to rotate the roller at a predetermined constant speed. The belt is driven by the belt-driving motor in accordance with the load applied to the belt-driving mechanism. The belt thus driven receives an external load which varies at all times. The belt rollers receive the external load which varies depending on processes. For example, in a belt-driving mechanism used in an electrophotographic printer, the external load applied to the belt-driving mechanism by the component units, such as a developing unit and a transferring unit, varies depending on each process, such as a charging process, an exposing process, a developing process, a transferring process, or a cleaning process.

Therefore, the output of the belt-driving motor must be set to an optimal value quickly and accurately so as to control the rotation of the belt at a predetermined speed.

The flow of routines in a known circuit for controlling a belt-driving mechanism is described below. In a belt-driving routine, no external load is applied to the belt. In a developing-unit-driving routine, load is applied to the belt by development rollers. In a transfer-roller-driving routine, a maximum load is applied to the belt by a transfer roller and by the development rollers. In a known method for controlling a belt-driving motor, a servo constant and a servo parameter are set in a sequence of the belt-driving routine. The set values are those optimized for the maximum load. The operation in the known method is performed by using the optimized values in a servo-computing expression. However, the servo constant and the servo parameter are not set in the subsequent developing-unit-driving and transfer-roller-driving routines. By the known method, the control of rotation at a constant speed is possible in a servo system in which the difference in load between a maximum-load-state and the no-load-state is not significantly large.

However, in a colored electrophotographic printer in particular, the difference in load between a maximum-load-state and the no-load-state tends to increase due to enlarged component units of the printer and due to the printer being complex and increased in size. Therefore, a problem occurs in that complex and large-scale servo-computation expressions must be prepared for forming a software servo-mechanism, whereby a high-speed servo-controller must be provided for reducing computation processing time.

SUMMARY OF THE INVENTION

Accordingly, it is an object of the present invention to provide a belt-driving circuit for realizing a software servo-mechanism to be controlled at an optimal value in a device in which the external load applied to the belt varies greatly.

To the end, according to a first aspect of the present invention, a belt-drive-control circuit is provided, which controls a DC motor for driving the belt-driving mechanism including rollers and a belt mounted on the rollers by using a software servo-mechanism. The belt-drive-control circuit comprises a controller for controlling the DC motor by using servo constants and servo parameters variable in accordance with the variation in the load applied to the belt.

With this arrangement, the belt-driving mechanism and the units connected thereto can be driven by the DC motor with accuracy, even when variation in the load applied to the belt occurs, by controlling the DC motor in accordance with servo constant and servo parameter optimal for a particular loaded state of the belt. The control is possible by providing a control method in which the servo constant and the servo parameter are variable in accordance with the load applied to the belts. In the belt-drive-control circuit, computation processes can be proceeded easily because it is not necessary to modify known computation expressions for a software servo-mechanical control. Therefore, the driving accuracy can be maintained at a high level without upgrading a computing device.

In the belt-drive-control circuit according to the present invention, the controller comprises a memory unit and a computing unit. The memory unit stores data on the load applied to the belt and a plurality of sets of the servo constants and the servo parameters. The computing unit receives the data on the load applied to the belt from a central processing unit. Then, the computing unit reads from the memory unit the servo constant and the servo parameter in accordance with the received data on the load applied to the belt, performs a servo-computation by using the read servo constant and servo parameter, and computing rotational-speed data.

According to a second aspect of the present invention, an electrophotographic device comprises a photosensitive belt, a DC motor, a plurality of rollers, a central processing unit, and a belt-drive-control circuit according to the first aspect of the present invention. The DC motor drives the photosensitive belt. The plurality of rollers may be individually come into contact with and separate from the photosensitive belt at the peripheries of the rollers. The central processing unit controls the entire operation of the electrophotographic device including the movement of the plurality of rollers toward and away from the photosensitive belt. The belt-drive-control circuit controls the DC motor by using a software servo-mechanism. The central processing unit computes load data on the photosensitive belt in each driving process in which load varies between each process in accordance with the number of the rollers in contact with the photosensitive belt at the peripheries of the rollers. The central processing unit enables to send the load data to the belt-drive-control circuit.

The electrophotographic device according to the present invention has an advantage due to the above-described belt-drive-control circuit in that a belt-driving mechanism and units included in the belt-driving mechanism can be driven with accuracy regardless of a process proceeded electrophotographically. For example, the process are such as a charging process, an exposure process, a developing process, a transferring process, or a cleaning process, thereby improving the quality of electrophotography.

DESCRIPTION OF THE PREFERRED EMBODIMENTS

Figure 1:
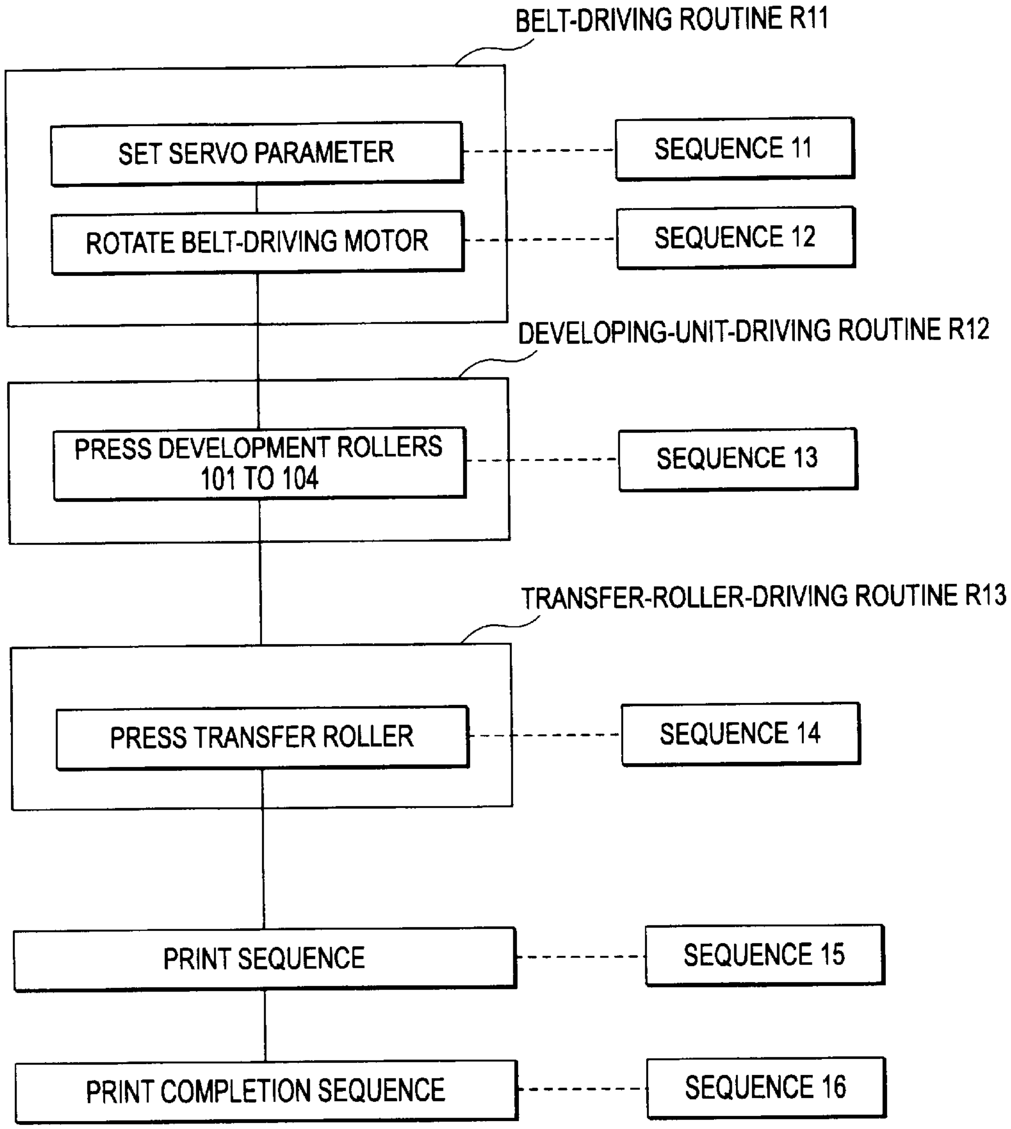
FIG. 1 PRIOR ART
FIG. 1 is a flowchart of a control operation in a known belt-drive-control circuit.

With reference to FIG. 1, the flow of control by a known belt-drive-control circuit is described below. In a belt-driving routine R11, no load is applied to the belt. In a developing-unit-driving routing R12, load is applied by develop rollers (see FIG. 4) to the belt. In a transfer-roller-driving routine R13, a maximum load is applied to the belt by the develop rollers and by transfer rollers (see FIG. 4). In a known method for controlling a belt-driving motor, a servo constant and a servo parameter are set in a sequence 11 in the belt-driving routine R11, as shown in FIG. 1. The control is performed by using the set values, which are optimized for the maximum load, in servo computation expressions. In the known belt-drive-control circuit, the servo constant and the servo parameter are not set in the subsequent developing-unit-driving routine R12 and transfer-roller-driving routine R13. By the known method, the control of rotation at a constant speed is possible in a servo system in which the difference in load between a maximum load state and the no-load state is not significantly large.

However, in a colored electrophotographic printer in particular, the difference in load between a maximum load state and the no-load state tends to increase due to enlarged component units of the printer and due to the printer being complex and increased in size. Therefore, a problem occurs in that complex and large-scale servo-computation expressions must be prepared for forming a software servo-mechanism, whereby a high-speed servo-controller must be provided for reducing computation processing time.

Figure 2:
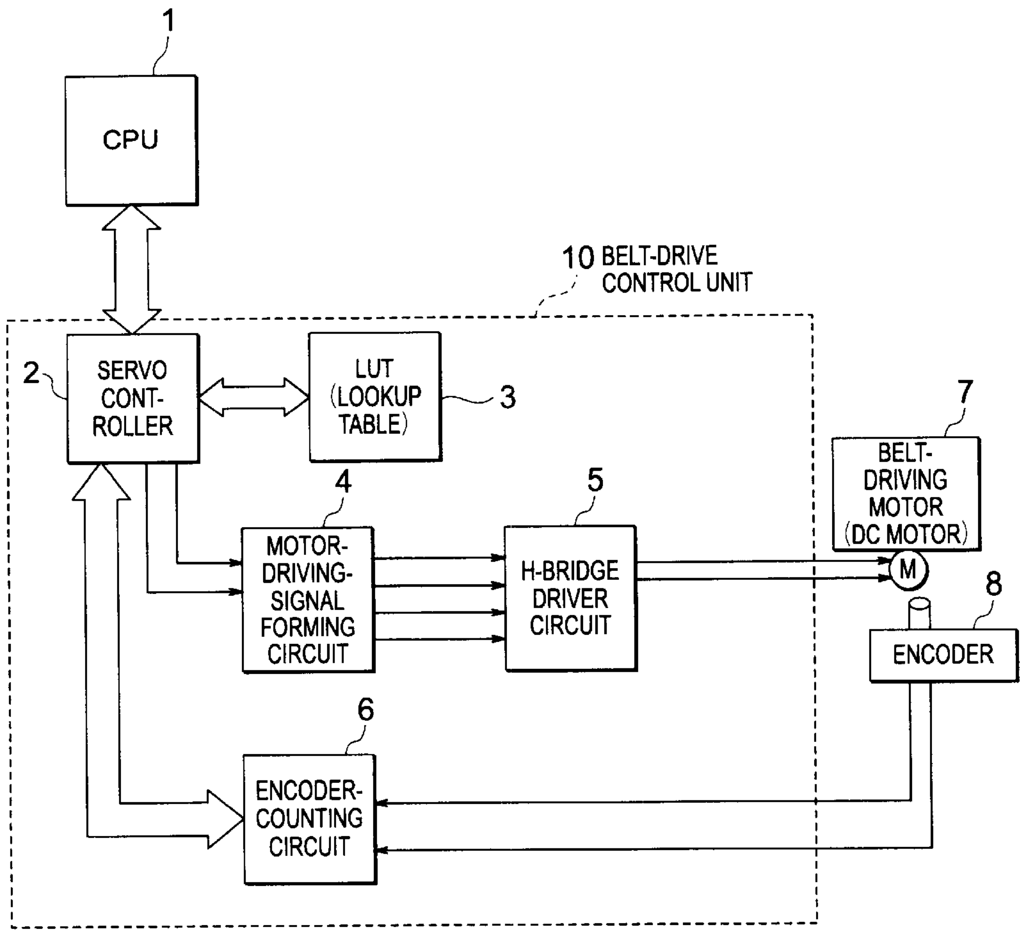
FIG. 2 is a schematic block diagram of a belt-drive-control motor according to an embodiment of the present invention.
Figure 3:
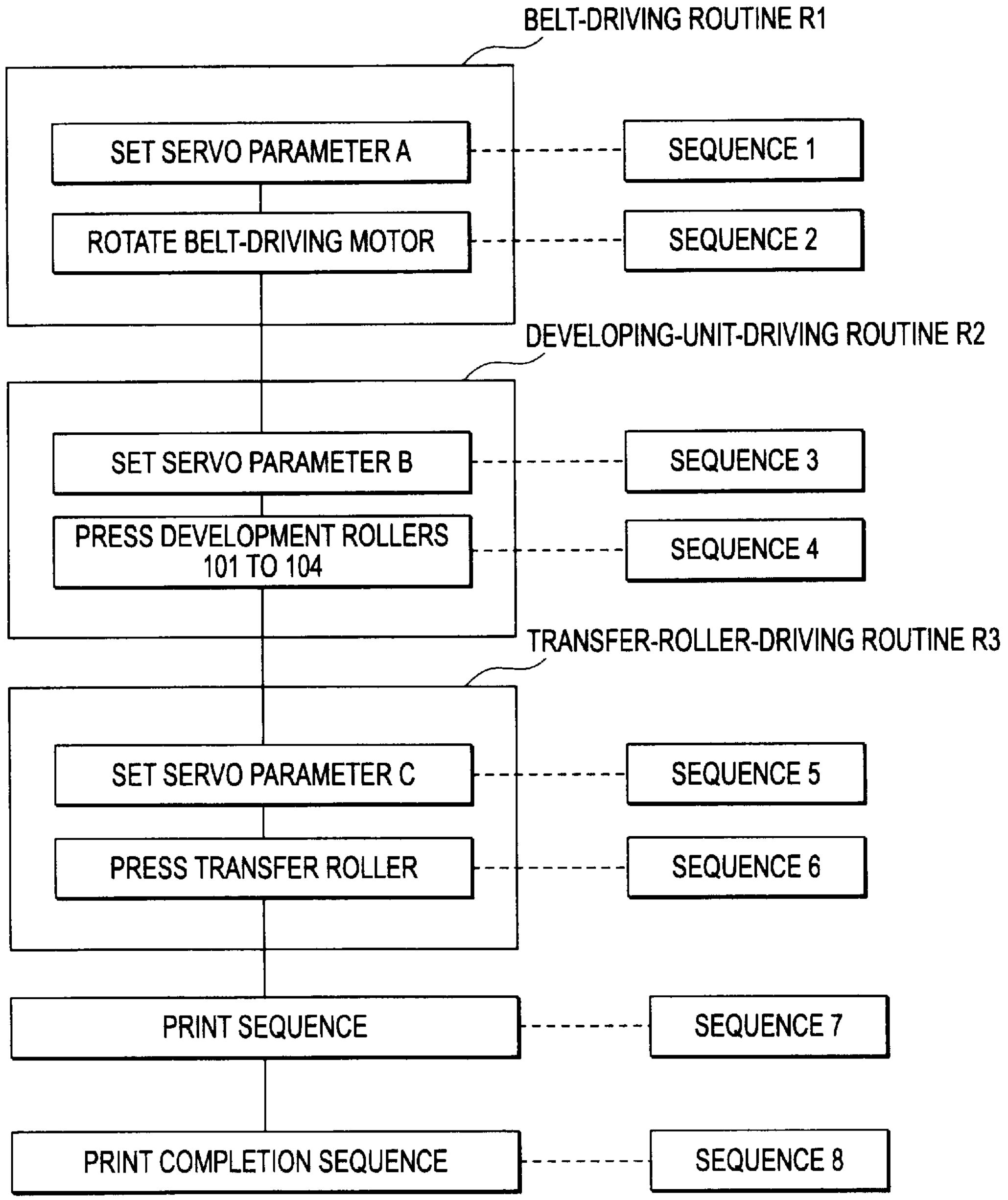
FIG. 3 is a flowchart of a control operation in the belt-drive-control motor according to the embodiment of the present invention.
Figure 4:
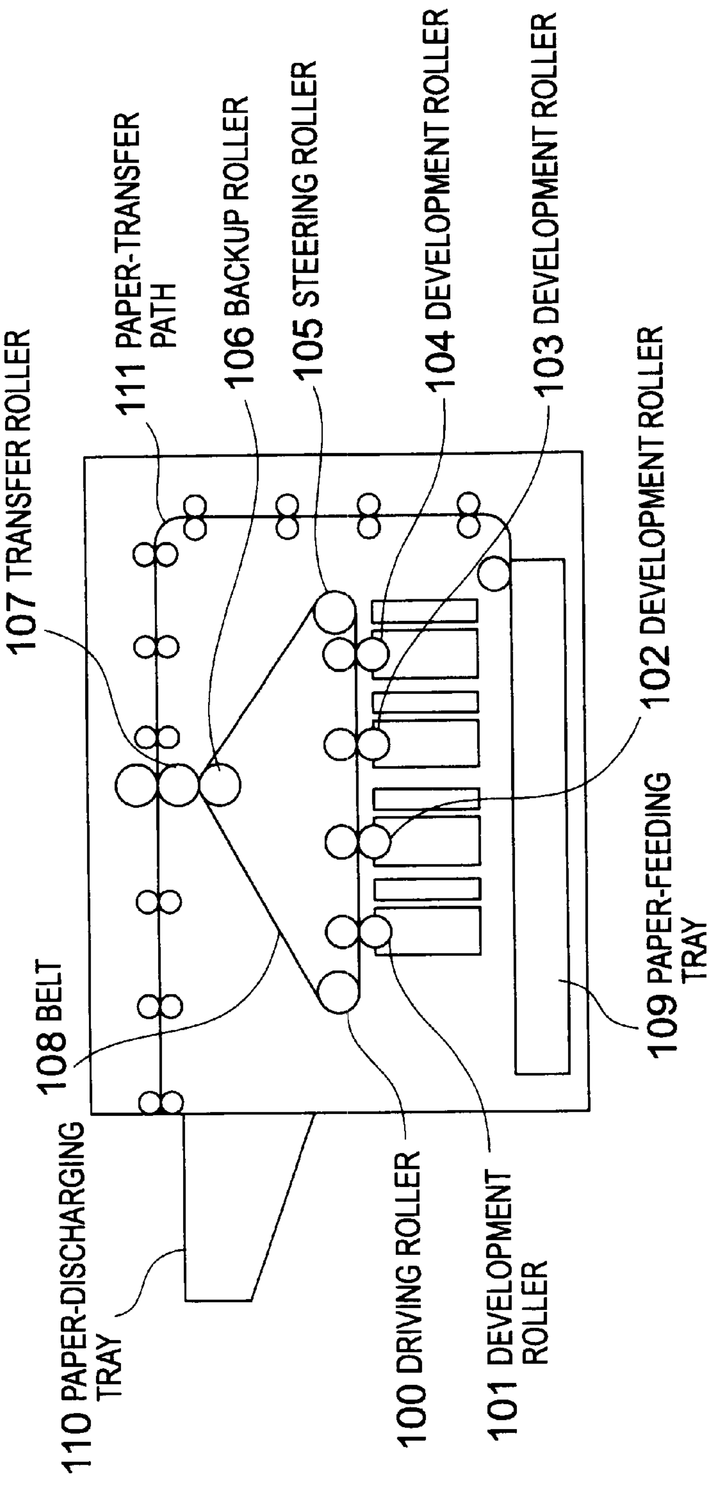
FIG. 4 is a sectional view of a belt-driving mechanism of an electrophotographic printer using the belt-drive-control circuit according to the embodiment of the present invention and including units disposed in the vicinity of the belt-driving mechanism, which apply loads to the belt-driving mechanism.

With reference to FIGS. 2 to 4, a belt-drive-control circuit according to an embodiment of the present invention is described below, in which the above problem in the known technology is overcome. In this embodiment, the belt-drive-control circuit according to the present invention is used for controlling the driving of a photosensitive belt of an electrophotographic printer. FIG. 2 is a block diagram of the belt-drive-control circuit according to the embodiment of the present invention.

In FIG. 2, a belt-drive-control circuit 10 according to the present invention comprises a servo controller 2, an LUT (lookup table) 3 which is a memory, a motor-driving-signal converting circuit 4, an H-bridge driver circuit 5, and an encoder-counting circuit 6.

The servo controller 2 controls the belt-drive-control circuit 10. The servo controller 2 comprises a ROM in which an algorithm of a control method for driving a belt is programmed. The ROM stores a computation expression and the like for controlling by a so-called "software servo" system.

The LUT 3 stores the servo constants and servo parameters which are used by the servo controller 2 when servo computing. The servo constants and servo parameters are read by the servo controller 2 for use in the computation expression, as needed.

The motor-driving-signal converting circuit 4 converts a computed signal outputted by the servo controller 2 into a driving signal for a belt-driving motor.

The H-bridge driver circuit 5 comprises a driver IC and the like which convert the motor-driving signal outputted by the motor-driving-signal converting circuit 4 into a motor-driving voltage.

The encoder-counting circuit 6 for determining the speed data from an encoder 8 which has been fed back from a belt-driving motor 7 outputs the determined value to the servo controller 2.

As described above, the belt-drive-control circuit 10 forming a belt-driving-motor control system in a closed loop controls the belt-driving motor 7 so as to rotate at a constant speed.

The function of each unit included in the belt-drive-control circuit 10 according to the present invention is described below with reference to FIG. 2.

A CPU 1 disposed upstream of the belt-drive-control circuit 10 controls the entire print sequences of the electrophotographic printer. The CPU 1 outputs drive-control commands to the individual units constituting the electrophotographic printer when the CPU 1 receives a request for printing from the operator through an operation panel or the like. The servo controller 2 receives data concerning the load (load data) applied on the belt together with a command to rotate the belt-driving motor 7 (motor-rotation command) from the CPU 1. The load data are bit data converted from information on the number of units which apply load to the belt by being pressed into contact therewith. For example, when eight units are pressed into contact with the belt, data of eight bits formed by one bit per unit are sent to the servo controller 2.

When the servo controller 2 receives the motor-rotation command, the servo controller 2 computes a servo computation expression programmed in advance therein, and outputs rotational-speed data for the belt-driving motor 7 to the motor-drive-signal converting circuit 4. The servo controller 2 when performing the servo computation, uses values of appropriate servo constant and servo parameter which are read from the LUT 3 in response to the load data received together with the motor-rotation command. The LUT 3 stores the servo constants and servo parameters optimized by experiments and evaluations performed in advance in accordance with the load which varies between each print sequence.

The motor-drive-signal converting circuit 4 converts the rotational-speed data received from the servo controller 2 into a signal for driving the driver circuit 5 formed with H-bridges, and outputs the same.

The H-bridge driver circuit 5 converts the driving signal into a motor-driving voltage, and outputs the same to the belt-driving motor 7, whereby the belt-driving motor 7 starts rotating. The rotational speed of the belt-driving motor 7 is measured by the encoder 8. The rotational speed data from the encoder 8 are determined and are converted into digital data by the encoder-counting circuit 6, and are fed back to the servo controller 2.

The servo controller 2 compares the fed-back data of the actual rotational speed of the belt-driving motor 7 with a targeted rotational speed thereof, performs the servo computation so that the belt-driving motor 7 rotates at a constant speed, and outputs the rotational-speed data to the motor-drive-signal converting circuit 4.

The above operation is repeatedly performed, whereby the belt-driving motor 7 rotates at a constant speed by being software-controlled in a closed loop.

FIG. 4 shows units disposed in the vicinity of the belt-driving mechanism of the electrophotographic printer, the units applying external loads to the belt-driving mechanism. In the belt-driving mechanism which is controlled by the belt-drive-control circuit 10 according to the present invention, external loads are applied to a belt 108 by development rollers 101, 102, 103, and 104, a transfer roller 107, and the like being pressed into contact with the belt 108.

In FIG. 4, the belt 108 is supported by a plurality of rollers, such as a driving roller 100, a steering roller 105, and a backup roller 106, so that the belt 108 can rotate at a constant speed. The belt 108 is driven by the driving force of the belt-driving motor 7 (see FIG. 2) transmitted to the driving roller 100 via gears. The steering roller 105 correct for meandering of the belt 108. The backup roller 106 opposes the transfer roller 107 across the belt 108. The backup roller 106 is pressed by the transfer roller 107 via the belt 108, and transmits the driving force, which is transmitted to the belt 108, to the transfer roller 107. The transfer roller 107 transfers images formed with toner to sheets of paper.

The electrophotographic printer also comprises a paper-feeding tray 109, a paper-discharging tray 110, and guide rollers and driving rollers disposed along a paper-transfer path 111 between the trays 109 and 110.

The operation of the belt-drive-control circuit 10 is described below with reference to FIG. 2 which shows the configuration of the belt-drive-control circuit 10, and FIG. 3 which shows the flowchart of the operation thereof.

The flow of control commanded to perform by the CPU 1 shown in FIG. 2 is described by the flowchart shown in FIG. 3. The control is performed in sequences 1 to 8 by the servo controller 2 in response to the command and the data from the CPU 1. The control operation is fully described below in order of the sequences in the flowchart shown in FIG. 3.

The CPU 1 which is requested to start printing outputs a command to perform a belt-drive routine R1.

In sequence 1, the servo controller 2 receives the current load data with respect to the belt 108 from the CPU 1. In this case, since the external load has not been applied, the servo controller 2 receives no-load data. The servo controller 2 reads a servo constant and servo parameter A from the LUT 3, and inputs the same to a servo computation expression.

In sequence 2, the servo controller 2 computes the servo computation expression, programmed in advance, by using the servo parameter A inputted in sequence 1, in response to a belt-rotation command received from the CPU 1.

The servo controller 2 controls the belt-driving motor 7 so as to rotate at a targeted speed, as described above with reference to FIG. 2.

After the belt 108 starts rotating, the CPU 1 commands to perform a development-unit-driving routine R2.

In sequence 3, the servo controller 2 receives from the CPU 1 load data at a state in which the development rollers 101 to 104 are pressed into contact with the belt 108. The servo controller 2 reads from the LUT 3 a servo constant and servo parameter B to be used when load is applied by the development rollers 101 to 104. The servo controller 2 substitutes the servo constant and servo parameter B in the servo computation expression. The CPU 1 sequentially presses the development rollers 101 to 104 into contact with the belt 108.

In sequence 4, the servo controller 2 computes the servo computation expression, programmed in advance, by using the servo parameter B inputted in sequence 3.

The servo controller 2 controls the belt-driving motor 7 so as to rotate at a targeted speed, as described above with reference to FIG. 2.

After the development rollers 101 to 104 are pressed into contact with the belt 108, the CPU 1 commands to perform a transfer-roller-driving routine R3.

In sequence 5, the servo controller 2 receives from the CPU 1 load data corresponding to a state in which the transfer roller 107 is additionally pressed into contact with the belt 108. The servo controller 2 reads from the LUT 3 a servo constant and servo parameter C to be used when load is applied by the development rollers 101 to 104 and by the transfer roller 107. The servo controller 2 substitutes the servo constant and servo parameter C in the servo computation expression. The CPU 1 presses the transfer roller 107 into contact with the belt 108.

In sequence 6, the servo controller 2 computes the servo computation expression, programmed in advance, by using the servo parameter C inputted in sequence 5.

The servo controller 2 controls the belt-driving motor 7 so as to rotate at a targeted constant speed, as described above with reference to FIG. 2.

After the transfer roller 107 is pressed into contact with the belt 108, the process proceeds to a print sequence in response to the command of the CPU 1, an electrophotographic process is performed, and an image is outputted to be printed on a sheet.

In sequence 7, the servo controller 2 controls the belt-driving motor 7, so as to rotate at a predetermined constant speed, by using the servo constant and servo parameter C which is to be used when a maximum load is applied.

After the print sequence is completed, the process proceeds to a completion sequence, thereby completing the electrophotographic process.

In sequence 8, the servo controller 2 stops the movement of the belt 108 in response to a command of the CPU 1 to the effect.

The CPU 1 stops all the operation of the units including the application of external load to the belt 108, and stays in a waiting mode until the subsequent request for printing is inputted. Then, the same control operation is performed on every request for printing.

According to the embodiment of the present invention, the LUT 3 for storing the servo constants and servo parameters is separated from the servo controller 2 so as to make the configuration of the circuits to be described clearly. However, a memory for storing these data may be included in the servo controller 2 for practical use.

The above-described belt-drive-control circuit according to the present invention comprises a controller which uses servo constants and servo parameters variable in accordance with the variation in load applied to the belt. Therefore, software servo is made possible for controlling the rotation of the belt at an optimal value even in a large apparatus in which the load varies greatly due to the large component units.

What is claimed is:

1. A belt-drive-control circuit for controlling a DC motor for driving a belt-driving mechanism, including rollers and a belt mounted on the rollers by using a software servo-mechanism, wherein the belt-drive-control circuit comprises:

- a servo controller for computing a servo computation expression in order to control the DC motor by varying servo constants and servo parameters in accordance with a variation in a load applied to the belt.

2. A belt-drive-control circuit for controlling a DC motor for driving a belt-driving mechanism, including rollers and a belt mounted on the rollers by using a software servo-mechanism, wherein the belt-drive-control circuit comprises:

a controller for controlling the DC motor by varying servo constants and servo parameters in accordance with a variation in a load applied to the belt, said controller comprising:

a memory unit storing data on the load applied to the belt and a plurality of sets of the servo constants and the servo parameters; and a computing unit for receiving the data on load applied to the belt from a central processing unit, reading from the memory unit the servo constant and the servo parameter in accordance with the received data on the load applied to the belt, performing a servo-computation by using the read servo constant and servo parameter, and computing rotational-speed data.

3. A belt-drive-control circuit as claimed in claim 2, wherein:

the computing unit comprises a ROM storing a programmed algorithm of a control system for controlling driving of the belt; and the memory unit storing the plurality of sets of the servo constants and the servo parameters to be used by the computing unit for servo-computing.

4. A belt-drive-control circuit as claimed in claim 3, wherein a programmed algorithm is a computation expression for controlling the driving of the belt in a software servo system.

5. A belt-drive-control circuit as claimed in claim 2, wherein the controller further comprises:

a motor-driving-signal converting circuit for converting a computed output from the computing unit into a driving signal for a belt-driving motor, an H-bridge driver circuit for converting the driving signal outputted from the motor-driving-signal converting circuit into a motor-driving voltage, and an encoder-counting circuit for converting the speed data on the belt-driving motor outputted by an encoder into digital data.

6. A belt-drive-control circuit as claimed in claim 5, wherein:

the rotational speed of the belt-driving motor is measured by the encoder, is determined as rotational-speed data by the encoder-counting circuit, and is thereby converted into digital data and is fed back to the computing unit;

wherein the computing unit compares the fed-back actual rotational-speed data of the belt-driving motor with a targeted rotational speed, performs the servo-computation, and outputs the computed rotational-speed data to the motor-driving-signal converting circuit so that the belt-driving motor rotates at a constant speed; and wherein a belt-driving-motor control system is formed in a closed loop in which control operation is repeatedly performed, thereby controlling the belt-driving motor so as to rotate at a constant speed.

7. A belt-drive-control circuit as claimed in claim 2, wherein:

the data of the load applied to the belt are bit data converted, in a print sequence performed by the computing unit from information on a number of units which apply load to the belt by being pressed into contact therewith.

8. An electrophotographic device comprising:

a photosensitive belt;

a DC motor for driving the photosensitive belt;

a plurality of rollers individually coming into contact with and separating from the photosensitive belt at the peripheries of the rollers;

a central processing unit for controlling the entire operation of the electrophotographic device including the movement of the plurality of rollers toward and away from the photosensitive belt; and a belt-drive control circuit including a software servo control mechanism for controlling the DC motor, wherein the central processing unit computes load data in each driving process in which the load applied to the photosensitive belt varies between each process and in accordance with the number of the rollers in contact with the photosensitive belt at the peripheries of the rollers, and enables to send the load data to the belt-drive-control circuit.

9. An electrophotographic device comprising:

a photosensitive belt;

a DC motor for driving the photosensitive belt;

a plurality of rollers individually coming into contact with and separating from the photosensitive belt at the peripheries of the rollers;

a central processing unit for controlling the entire operation of the electrophotographic device including the movement of the plurality of rollers toward and away from the photosensitive belt; and a belt-drive control circuit for controlling the DC motor by using a software servo-mechanism, wherein the central processing unit computes load data in each driving process in which the load applied to the photosensitive belt varies between each process and in accordance with the number of the rollers in contact with the photosensitive belt at the peripheries of the rollers, and enables to send the load data to the belt-drive-control circuit, wherein the belt-drive-control circuit includes a controller for controlling the DC motor by varying servo constants and servo parameters in accordance with the variation in the load applied to the photosensitive belt.

10. An electrophotographic device as claimed in claim 9, wherein the controller comprises:

a memory unit storing data on the load applied to the photosensitive belt and a plurality of sets of the servo constants and the servo parameters; and a computing unit for receiving the data on the load applied to the photosensitive belt from a central processing unit, reading from the memory unit the servo constant and the servo parameter in accordance with the received data on the load applied to the photosensitive belt, performing a servo-computation by using the read servo constant and servo parameter, and computing rotational-speed data.

11. The electrophotographic device according to claim 8, further comprising:

a LUT (look up table);

a motor-driving-signal converting circuit;

an H-Bridge driver circuit; and an encoder-counting circuit.

12. The electrophotographic device according to claim 11, wherein said LUT serves as a memory device and stores servo constants and servo parameters used by said servo control mechanism for servo computing.

13. The electrophotographic device according to claim 11, wherein said H-Bridge driver includes a driver IC for converting a motor-driving signal outputted by said motor-driving-signal converting circuit into a motor-driving voltage.

14. The electrophotographic device according to claim 11, wherein said encoder-counting circuit determines speed data based on an encoder feeding back data outputted from said motor to said servo control mechanism.

15. The belt-drive-control circuit according to claim 1, wherein said servo controller comprises a memory unit storing data on said load applied to said belt and a plurality of sets of said servo constants and said servo parameters.

16. The belt-drive-control circuit according to claim 15, wherein said servo controller further comprises a computing unit for receiving data on said load applied to said belt from a central processing unit, reading from a memory unit said servo constant and said servo parameter in accordance with said received data on said load applied to said belt, performing a servo-computation by using said read servo constant and servo parameter, and computing rotational-speed data.

17. The belt-drive-control circuit according to claim 1, wherein said belt-drive-control circuit for controlling said DC motor to rotate at a constant speed uses a software servo-mechanism.

18. The belt-drive-control circuit according to claim 1, wherein said belt comprises a photosensitive material.

19. The belt-drive-control circuit according to claim 1, wherein said servo controller repeatedly performs said servo-computation.

20. The belt-drive-control circuit according to claim 1, wherein said servo controller is pre-programmed with said servo computation expression.

* * * * *